J. A. FRAUENHEIM.
METHOD OF MANUFACTURING COMPOSITE BOLTS.
APPLICATION FILED DEC. 10, 1914.
1,228,198.
Patented May 29, 1917.
2 SHEETS—SHEET 2.
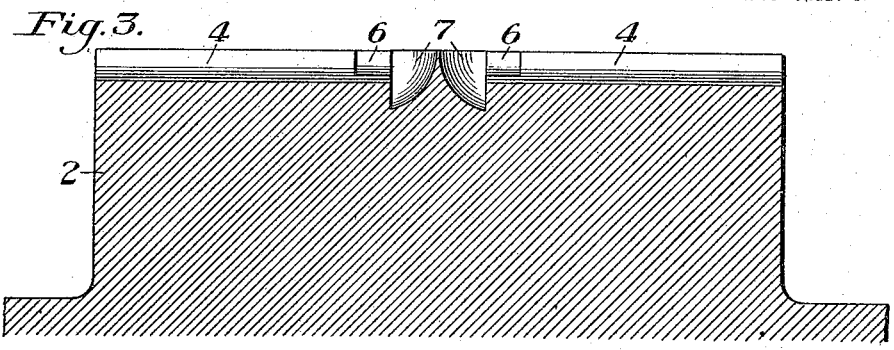
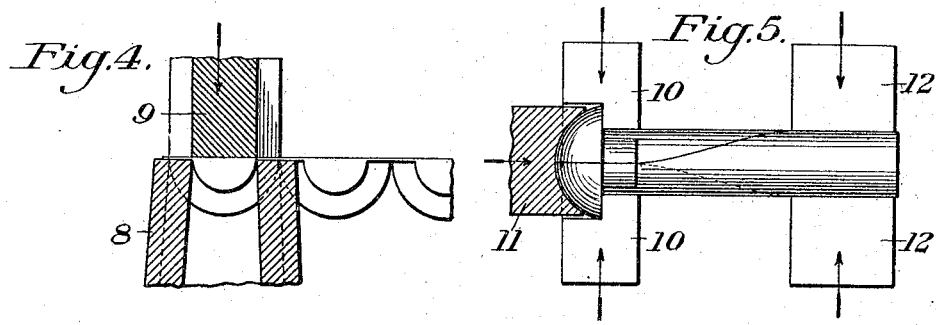
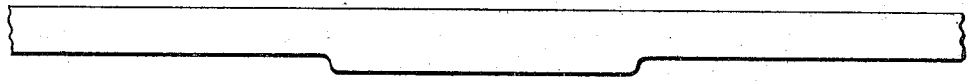
WITNESSES
R. A. Balderson
G. B. Bliming
INVENTOR
J. A. Frauenheim

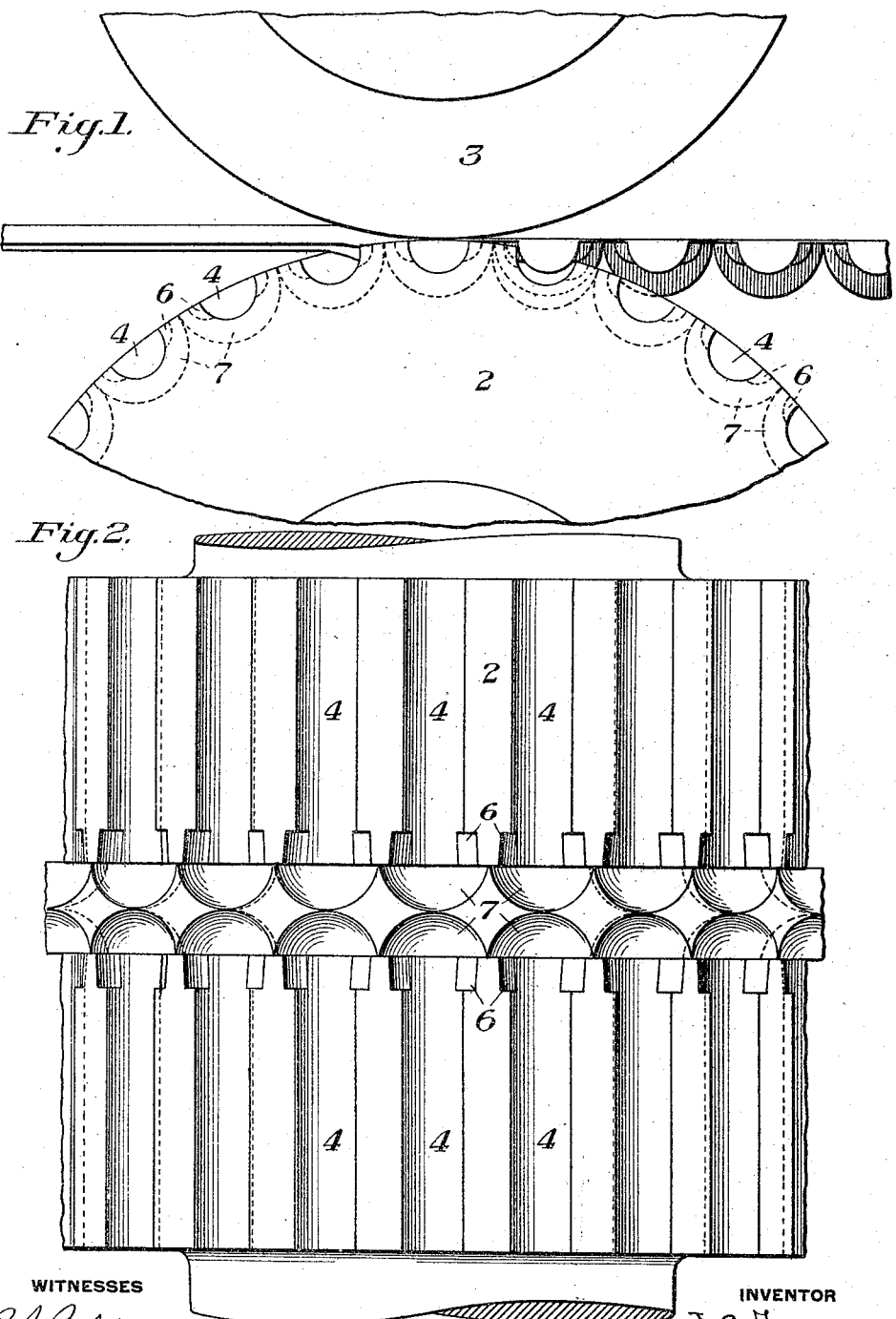

UNITED STATES PATENT OFFICE.

JOSEPH A. FRAUENHEIM, OF PITTSBURGH, PENNSYLVANIA, ASSIGNOR TO KERNER MANUFACTURING COMPANY, OF PITTSBURGH, PENNSYLVANIA, A CORPORATION OF PENNSYLVANIA.

METHOD OF MANUFACTURING COMPOSITE BOLTS.

1,228,198.       Specification of Letters Patent.      Patented May 29, 1917.

Application filed December 10, 1914. Serial No. 876,532.

*To all whom it may concern:*

Be it known that I, JOSEPH A. FRAUENHEIM, a citizen of the United States, residing at Pittsburgh, in the county of Allegheny and State of Pennsylvania, have invented a new and useful Improvement in Methods of Manufacturing Composite Bolts, of which the following is a full, clear, and exact description, reference being had to the accompanying drawings, forming part of this specification, in which—

Figure 1 is a side elevation of portions of two rolls showing one form of producing semi-bolt blanks.

Fig. 2 is a plan view of the bottom roll shown in Fig. 1.

Fig. 3 is a longitudinal section through a portion of the bottom roll.

Fig. 4 is a vertical section through a punch and die for shearing or cutting the blanks from the sheet.

Fig. 5 is a detail sectional view of a bolt-twisting device.

Fig. 6 is a side elevation of a finished bolt.

Fig. 7 is an end view of a deformed bar or sheet for forming blanks between rolls, such as shown in Figs. 1 and 2, and Fig. 8 is a plan view of a plurality of semi-bolt blanks formed in tandem from a bar.

The invention relates to an improved method of manufacturing composite bolts which are made from two members twisted about each other.

The object of my invention is to provide a method whereby composite bolts can readily and cheaply be made from two semi-bolt blanks.

The precise nature of my invention will be best understood by reference to the accompanying drawings, which will now be described, it being premised, however, that various changes may be made in the apparatus for carrying out my invention, without departing from the spirit and scope of my invention as defined in the appended claims.

Referring to the drawings, the numeral 2 designates the bottom or cavity roll, and 3 the upper roll. The lower roll is provided with a plurality of cavities 4 for forming the body of the bolt, and also with recessed extensions 6 and 7 for forming the heads and securing shoulders of the bolt.

In Figs. 1 and 2 I have shown rolls which are adapted to roll two sets of blanks head to head, although I desire it to be understood that any number of sets of blanks may be rolled in the manner shown, or the heads of one series may be adjacent to the ends of the bodies of another series, or the heads of the two series may be formed at the outer edges of the rolls.

When forming blanks between rolls of this character, I take a deformed bar, such as shown in Fig. 7, and pass it between the rolls, the thickened portion at the center thereof running in a longitudinal direction between the rolls to form the heads, there being sufficient metal in the sheet to form the semi-bolt blanks which are held together by fins or a thin sheet of metal which extends from blank to blank.

The blanks are then placed on a die, such as shown at 8 in Fig. 4, and are sheared from the sheet by a punch 9. Two of the blanks are then assembled and are held between holding devices 10 and 11, there being two holding devices such as 10, which are movable in a vertical direction relative to each other to grasp the body of the bolt and the holding flanges adjacent to the end side or the head, while the holding member 11 is moved in a longitudinal direction to hold the head in position between the members 10. The other ends of the members are clamped between the members 12 which are rotated to twist the two bolt members about the longitudinal axis of the bolt. After the two members have been twisted the bolt blank is then threaded in the desired manner.

If desired, I can form semi-blanks in tandem, as indicated in Fig. 8, which are sheared apart at the junction between the lower end of the body member of one bolt and the head of the other bolt.

The advantages of my invention result from the provision of a method whereby a plurality of similarly shaped semi-bolt blanks can be formed in a continuous manner so that they can be separated from each other and assembled to form the bolt.

I claim:

1. The method of manufacturing semi-bolt blanks in sheet form, consisting in passing a sheet between a pair of forging rolls, and forcing the metal of the sheet into transverse blank-forming cavities to form a plurality of semi-bolt blanks arranged side by side throughout the length of the sheet and connected to each other by thin webs, substantially as described.

2. The method of manufacturing headed semi-bolt blanks in sheet form, consisting in passing a sheet having a thickened longitudinal portion between a pair of rolls, and forcing the metal of the sheet into transverse blank-forming cavities to form a plurality of semi-bolt blanks arranged side by side throughout the length of the sheet and connected to each other by thin webs, substantially as described.

3. The method of manufacturing bolt blanks in sheet form, consisting in passing a sheet having a thickened central longitudinal portion between a pair of rolls having two sets of transversely arranged blank-forming cavities, and forcing the metal of the sheet into the blank-forming cavities to simultaneously form two sets of blanks arranged end to end transversely of the sheet, and connected to each other by thin webs, substantially as described.

In testimony whereof I have hereunto set my hand.

JOSEPH A. FRAUENHEIM.

Witness:
H. M. CORWIN.

Copies of this patent may be obtained for five cents each, by addressing the "Commissioner of Patents, Washington, D. C."